United States Patent
Soman et al.

(10) Patent No.: US 12,301,564 B2
(45) Date of Patent: May 13, 2025

(54) VIRTUAL SESSION ACCESS MANAGEMENT

(71) Applicant: Omnissa, LLC, Mountain View, CA (US)

(72) Inventors: Sisimon Soman, Sunnyvale, CA (US); Padoor Arun Chandramohan, Singapore (SG)

(73) Assignee: Omnissa, LLC, Mountain View, CA (US)

( * ) Notice: Subject to any disclaimer, the term of this patent is extended or adjusted under 35 U.S.C. 154(b) by 101 days.

(21) Appl. No.: 17/151,384

(22) Filed: Jan. 18, 2021

(65) Prior Publication Data

US 2022/0232004 A1    Jul. 21, 2022

(51) Int. Cl.
| | |
|---|---|
| *H04L 9/40* | (2022.01) |
| *G06F 9/451* | (2018.01) |
| *G06F 9/54* | (2006.01) |
| *G06F 16/783* | (2019.01) |
| *G06F 21/62* | (2013.01) |

(Continued)

(52) U.S. Cl.
CPC .......... *H04L 63/0861* (2013.01); *G06F 9/452* (2018.02); *G06F 9/541* (2013.01); *G06F 16/784* (2019.01); *G06F 21/6218* (2013.01); *G06F 21/84* (2013.01); *G06N 20/00* (2019.01);

(Continued)

(58) Field of Classification Search
CPC ... H04L 63/0861; H04L 63/102; G06F 9/452; G06F 16/784; G06F 9/541; G06F 21/6218; G06F 21/84; G06N 20/00; G06V 40/172; G06V 20/40
See application file for complete search history.

(56) References Cited

U.S. PATENT DOCUMENTS 4,789,895 A * 12/1988 Mustafa ................ H04N 7/035
                                                    348/478
9,485,292 B2 * 11/2016 Devireddy ............ H04L 67/562
(Continued)

FOREIGN PATENT DOCUMENTS

| EP | 3111429 B1 * | 4/2020 | ............. A61B 17/00 |
| JP | 7176189 B2 * | 11/2022 | |
| WO | WO-2018034989 A1 * | 2/2018 | ............. G06F 9/451 |

OTHER PUBLICATIONS

Title: Cloud-based Virtual Desktop Service Using Lightweight Network Display Protocol Authors: Sunwook Kim, Jihyeok Choi, Seongwoon Kim, and Hagyoung Kim Year: 2016 Publisher: IEEE.*

*Primary Examiner* — Shahriar Zarrineh
*Assistant Examiner* — Gita Faramarzi
(74) *Attorney, Agent, or Firm* — Kim & Stewart LLP

(57) ABSTRACT

Methods and systems are described for managing access to a virtual session. A user device can send a request for a virtual session to a virtual desktop interface ("VDI") server. The VDI server can send details of a user's account to a management server. The management server can send a machine learning ("ML") model trained to identify the user's face to the user device. The user device can apply the ML model to a video feed of the viewing area of the user device to verify the user's face. The VDI server can initialize the virtual session if the user's face is verified. The user device can monitor the video feed during the virtual session to detect unauthorized objects. If an unauthorized object is detected, the user device can terminate or minimize the session.

20 Claims, 4 Drawing Sheets

(51) Int. Cl.
*G06F 21/84* (2013.01)
*G06N 20/00* (2019.01)
*G06V 20/40* (2022.01)
*G06V 40/16* (2022.01)

(52) U.S. Cl.
CPC ............ *G06V 20/40* (2022.01); *G06V 40/172* (2022.01); *H04L 63/102* (2013.01)

(56) References Cited

U.S. PATENT DOCUMENTS

| | | | | |
|---|---|---|---|---|
| 9,582,272 | B1* | 2/2017 | Doucette | G06F 9/5044 |
| 9,898,619 | B1* | 2/2018 | Hadsall | G06F 21/6245 |
| 10,368,360 | B1* | 7/2019 | Dash | H04L 12/2803 |
| 10,749,885 | B1* | 8/2020 | Hoorvitch | H04L 63/08 |
| 10,958,722 | B2* | 3/2021 | Vysotsky | G06F 9/547 |
| 11,422,858 | B2* | 8/2022 | Kelly | G06F 9/4893 |
| 2009/0006537 | A1* | 1/2009 | Palekar | H04L 67/133 |
| | | | | 709/203 |
| 2009/0006597 | A1* | 1/2009 | Bade | G06F 21/577 |
| | | | | 714/E11.192 |
| 2015/0237097 | A1* | 8/2015 | Devireddy | H04L 67/01 |
| | | | | 709/203 |
| 2015/0304433 | A1* | 10/2015 | Xiao | G06F 9/45533 |
| | | | | 709/203 |
| 2018/0014189 | A1* | 1/2018 | Ellison | H04L 63/083 |
| 2018/0232591 | A1* | 8/2018 | Hicks | G06F 21/32 |
| 2019/0080173 | A1* | 3/2019 | Sharma | G06F 3/0304 |
| 2019/0082149 | A1* | 3/2019 | Correnti | G08B 13/19613 |
| 2020/0184531 | A1* | 6/2020 | Yen | G06Q 10/08 |
| 2020/0225964 | A1* | 7/2020 | Soman | H04L 63/105 |
| 2020/0358628 | A1* | 11/2020 | Achyuth | H04M 3/568 |
| 2021/0020022 | A1* | 1/2021 | Hutz | G06V 20/40 |
| 2021/0103645 | A1* | 4/2021 | Iordache | G06V 10/82 |
| 2021/0182440 | A1* | 6/2021 | Singh | G06F 21/6245 |
| 2021/0267515 | A1* | 9/2021 | Scanlin | A61B 5/747 |
| 2022/0210230 | A1* | 6/2022 | Yu | G06F 21/84 |
| 2022/0230177 | A1* | 7/2022 | Krushell | G06Q 20/3821 |
| 2023/0067239 | A1* | 3/2023 | Palamadai | A61B 5/0816 |

\* cited by examiner

VIRTUAL SESSION ACCESS MANAGEMENT

BACKGROUND

Businesses today are under constant threat from hackers attempting to breach network security measures and access corporate data. However, according to Verizon Data Breach Investigations Report, 34% of data breaches in the 2019 involved an internal actor. Incident costs for internal breaches amount to billions of dollars annually.

Current methods to mitigate the internal threat of unauthorized access to sensitive data are extremely restrictive and burdensome, or they are insufficient. As an example, in some industries, if employees want to access or work on sensitive data, they may only be allowed to do so from a Security Control Room with restricted access monitored by surveillance cameras. This is burdensome and not scalable in increasingly distributed work environments. Workers may be forced to surrender their smartphone before being allowed to enter this room to prevent them from capturing photos of sensitive information.

Some virtualization vendors, such as OBSERVEIT and CITRIX, are providing features that prevent the print screen functionality. However, this does not prevent an unauthorized person from standing behind an authorized user and viewing or taking a picture of the sensitive information. Current solutions do not prevent security breaches based on someone who simply shares the physical space with the authorized user.

As a result, a need exists for managing access to a virtual session on an endpoint device.

SUMMARY

Examples described herein include systems and methods for managing access to a virtual session. In an example, a user device can send a request for a virtual session to a virtual desktop infrastructure ("VDI") server. The request can include credentials for a user's account. The VDI server can verify the user credentials with an authentication service. The VDI server can also send information about the request to a management server. The information can include an identifier for the user account.

In an example, the management server can retrieve an ML model that has been trained to identify the user in a video stream. For example, the management server can be part of a Unified Endpoint Management ("UEM") that manages user devices in an enterprise environment. The UEM can request that the user take a picture of his or her face. In an example, this request can be part of an enrollment process. The management server can use the picture of the user to train an ML model to identify the user. Similar training can occur based on multiple users that are enrolled with the UEM system, allowing a single model to identify multiple such users in an example.

The management server can send the ML model to the user device. The user device can include, or be connected to, a video camera device, such as a web cam. The user device can instruct the video camera device to begin providing a video stream. The user device can then apply the ML model to the video stream to identify the user's face in the stream. In one example, if the user's face can be verified above a threshold, the user device can notify the VDI server. The VDI server can then provide the virtual session to the user device.

In one example, a VDI client on the user device can render the virtual session in a user interface. The VDI client can be an application on the user device that presents a virtual desktop on the user device and provides user inputs within the virtual desktop to the VDI server. For example, a VDI agent on the VDI server can send desktop interface data to the VDI client, and the VDI client can use the data to display the desktop interface on the user device. The VDI client can also detect user input on the user device, such as keyboard and mouse events, and send those inputs to the VDI agent. The VDI agent can provide the inputs to the operating system of the VDI server for executing the inputs. The video camera device can continue to capture video and provide a video stream to the user device. The VDI client can analyze the video stream and use an object detection model to detect and identify any objects that appear in the stream.

The VDI client can be configured to take certain mitigating actions when a detected object is not authorized to be in the viewing area of the virtual session. In one example, the VDI client can gather information about the session and the object. For example, the VDI client can gather information about who has viewed the virtual session, what objects are detected during the virtual session, what is being displayed when an object or person is detected, login details, and access locations. In another example, the VDI client can minimize the virtual session screen, force log off the virtual session, or disconnect the virtual session. In still another example, the VDI client can gather information about the object and the virtual session, and then provide the information to the VDI server. In such an example, the VDI server can be configured to take mitigating action or to instruct the VDI client on what mitigating action to take.

In one example, the VDI client can dynamically monitor the virtual session. This can include changing allowed objects and what mitigating action to take based on the content being displayed in the virtual session. For example, the VDI client can allow cameras, cell phones, or unauthorized viewers when no sensitive information is being displayed. In an example, the VDI client can log the detection of such objects and which users were present but take no further action. However, when sensitive content is being displayed, the VDI client can take mitigating actions to help prevent unauthorized viewing or picture taking of the sensitive content. For example, the VDI client can minimize the virtual session screen, force log off the virtual session, or disconnect the virtual session.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Methods and systems are described for managing access to a virtual session. A user device can send a request for a virtual session to a VDI server. The VDI server can send details of a user's account to a management server. The management server can retrieve an ML model trained to identify the user's face. The ML model can have been previously trained using an image of the user's face, among other faces of users enrolled with a UEM system. The management server can send the ML model to the user device. The user device can instruct a video camera device to begin capturing video of the viewing area of the user device. The user device can apply the ML model to a video stream from the video camera device to verify the user's face. The VDI server can initialize the virtual session if the user's face is verified. The user device can monitor the video stream during the virtual session to detect any unauthorized objects. The unauthorized objects can include cameras, phones, or faces of users that are not identifiable or that are identified but do not have authorization to view the content of the user's screen. If an unauthorized object is detected, the user device can terminate or minimize the virtual session.

Figure 1:
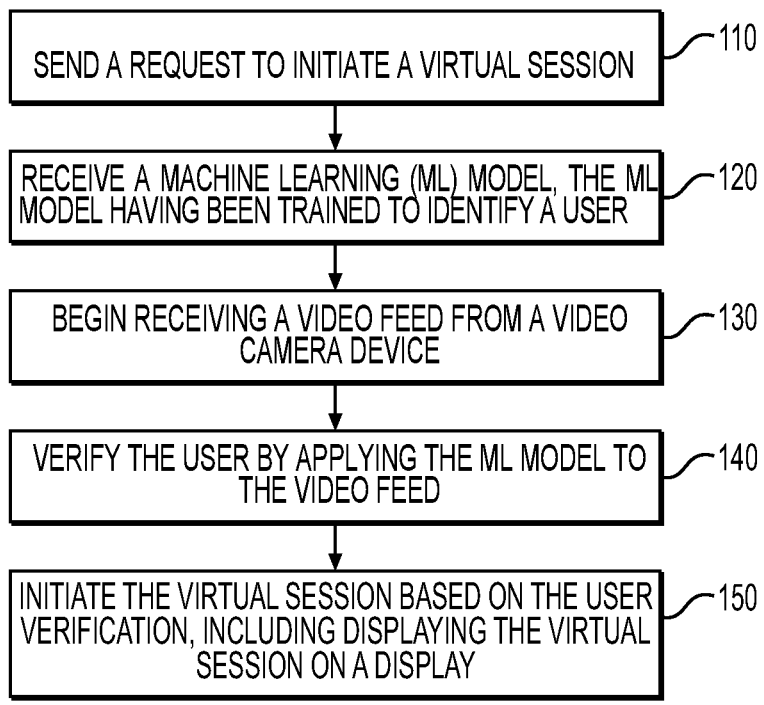
FIG. 1 is a flowchart of an example method for managing access to a virtual session.

FIG. 1 is a flowchart of an example method for managing access to a virtual session. At stage 110, a user device can send a virtual session initiation request to a VDI server. The user device can be one or more processor-based devices, such as a personal computer, tablet, or cell phone. The VDI server can be a single server or a group of servers, including multiple servers implemented virtually across multiple computing platforms. The VDI server can include software technology for providing and managing virtual desktop environments to endpoint devices like the user device. A virtual session can be an instance of such a virtual desktop environment.

As an example, the user device can include a VDI client that provides a user interface for a remote desktop environment. The VDI client can be an application on the user device that presents a virtual desktop on the user device and provides user inputs within the virtual desktop to the VDI server. For example, a VDI agent on the VDI server can send desktop interface data to the VDI client, and the VDI client can use the data to display the desktop interface on the user device. The VDI client can also detect user input on the user device, such as keyboard and mouse events, and send those inputs to the VDI agent. The VDI agent can provide the inputs to the operating system of the VDI server for executing the inputs.

A user can use the VDI client to make the virtual session initiation request. For example, the user can enter a name or network address for the virtual session along with authentication credentials. The client can send the request and the authentication credentials to the VDI server.

In an example, the VDI server can receive the request and check the credentials with an authentication service, such as ACTIVE DIRECTORY. After authentication, the VDI server can send details about the user's account to a management server. The management server can be responsible for managing user devices in an enterprise environment. For example, the management server can be part of a UEM system. The management server can also be a single server or a group of servers, including multiple servers implemented virtually across multiple computing platforms. In one example, the management server can provide UEM tools in a cloud-based environment. For example, the management server can manage and secure user devices and provide enterprise access and tools to user devices without requiring that the user devices be internally connected to the enterprise network, such as through a Virtual Private Network ("VPN") connection.

One of the management server's responsibilities can include enrolling user devices in the UEM system. For example, the management server can require that a management application be installed on user devices. The management application can be part of the operating system or an application executed by the operating system. Before granting access to enterprise resources, the management server can communicate with the management application to ensure that the user device has all the required security and compliance settings.

During the enrollment process, a user can provide a username and password for authentication and so that the management server can associate the user device with the user's account. In one example, the user device can prompt the user to take a picture of his or her face that the management server can also associated with the account. The picture need not be taken during the enrollment process in an example. For example, a user may enroll using a device that does not have a camera. In such an example, the management server can obtain a picture of the user at another time or from another source.

In an example, the management server can use the user's image to train a machine learning model ("ML model") to recognize the user's face. In some examples, the management server can use a third-party software to train the model, such as MICROSOFT AZURE and AMAZON REKOGNITION. The management server can also, or alternatively, access a facial recognition application programming interface ("API") to train the ML model, such as KAIROS FACE REGONITION API or LAMBDA LABS API. After training the ML model to recognize the user's face, the management server can store the ML model for future use.

In an example, upon receiving the user account details, the management server can retrieve the ML model for the user. At stage 120, management server can send the ML model to the user device. In one example, the management server can also send an object model. An object model can be a model trained to identify objects is a video stream. This can help identify any objects that may be used to capture content displayed in the virtual session, such as a cell phone or camera.

The one or more ML models can be sent to the user device as part of initiating the virtual session in an example. Alternatively, the ML models can be sent to the user device periodically as new models are trained. For example, the management server can track which version of an ML model resides at the user device and communicate with the management agent to provide an updated ML model independently of the user logging into the virtual session. In one example, the ML model is updated to recognize additional users and to change the status of which users are authorized (e.g., based on which users are still enrolled in the UEM system).

At stage 130, the user device can begin receiving a video stream from a video camera device. For example, the user device can be connected to, or include, a web cam. In one example, upon receiving the ML model, the user device can instruct the web cam to begin recording video. The video can be saved locally or uploaded to the management server so that it may be reviewed in case of a data breach. Alternatively, because saving video can require a considerable amount of computing, storage, and network resources, the user device can store the video stream in a temporary storage medium only long enough to process it using the stages described below. In one example, snippets of video are stored when an ML model recognizes a new object or new user. This can allow for easier review based on objects recognized.

At stage 140, the user device can verify the user by applying the ML model to the video stream. In an example, this stage can be performed by a VDI client. The VDI client can be an application on the user device responsible for rendering virtual sessions. As an example, the VDI client can be a remote desktop application. The VDI client can apply the ML model to identify the user's face in the video stream and verify that the user is in fact the individual attempting to access the virtual session.

The VDI client can also detect any objects or other persons in the video stream. For example, the VDI client can apply an object detection model to identify any objects in the video stream and identify what the objects are. In an example, the object detection model can be included as part of the ML model. In another example, the object detection model can be a separate model received from the management server. In still another example, the VDI client can create an API connection to an object detection library or application, such as TENSORFLOW.

At stage 150, the user device can initiate the virtual session based on the user verification. In an example, this can include the VDI client notifying the VDI server that is verified the user's face in the video stream, and the VDI server can then open a virtual session channel with the user device. In some examples, the VDI server can deny the virtual session request. In one example, the virtual session can be denied where the user cannot be verified. In another example, the virtual session can be denied if an unauthorized object is detected. For example, the UEM may prohibit mobile devices to be present, such as a cell phone, so that a person cannot take a picture of the virtual session and capture sensitive data. In yet another example, the virtual session can be denied if another person is detected in the video stream, such as someone not authorized to access the virtual session.

In one example, the VDI server can allow the virtual session based on the ML model being able to identify the user above a threshold percentage certainty. For example, it may be difficult for the ML model to determine with 100% certainty that the user's face in the video stream matches the model because of lighting, angles, video stream quality, and other factors. In one example, the threshold can be set by an administrator. In another example, the percentage certainty can depend on the amount of the user's face in the video stream that matches the ML model.

In some examples where the user's face cannot be verified above the threshold certainty level, the user can be required to provide a secondary authentication. For example, the user can be required to provide a two-factor authentication. In another example, if the user's face cannot be verified above the threshold, the VDI server can disable certain files and applications in the virtual session. For example, a user can gain access to the virtual session based on providing the correct credentials. However, if the user's face cannot be verified, the VDI server can disable access to sensitive applications and files.

In an example of the above-described method, an enterprise user enrolls a device with the enterprises' UEM system. As part of the enrollment process, the user can take a picture of his or her face, and that picture is uploaded to the UEM system. The UEM system can train an ML model to identify the user's face. Later, the user can log in to the device or another enterprise device and request access to a virtual desktop environment using a VDI client. The request can be sent to a VDI server in the UEM system and include authentication credentials. The VDI server can send details of the user's account to the management server. The management server can use the details to retrieve that ML model that can identify the user and then send the ML model to the user's device. In this example, the user device begins a video stream on a web cam it is connected to. The VDI client applies the ML model to the video stream to identify the user in the stream. The VDI client also verifies that there are no unauthorized objects or persons in the stream. The VDI client notifies the VDI server that it verified the user's face and that there are unauthorized objects or persons, and in response the VDI server initiates the virtual session with the user device.

Figure 2:
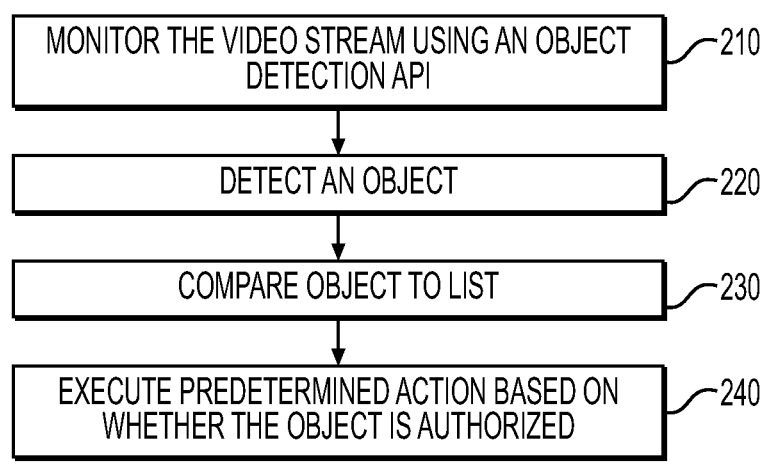
FIG. 2 is another flowchart of an example method for monitoring access to a virtual session.

After the virtual session is established, the VDI client can monitor the video stream to ensure that no unauthorized object or person is present while the virtual session is active. FIG. 2 is a flowchart of an example method for monitoring access to a virtual session. At stage 210, the user device can monitor the video stream. The monitoring can include applying the ML model to the video stream. In some examples, the VDI client can monitor the video stream only when predetermined events occur. This can help manage the computing resources used for monitoring the virtual session. As an example, the VDI client can be configured to monitor the video stream only when sensitive information is being displayed or when a sensitive application is open in the virtual session. For example, a managed application in the virtual session can trigger the monitoring when the user accesses a document from the enterprise's repository. When such an event occurs, the VDI client can cause the video camera to begin recording video, and the VDI client can begin analyzing the video stream by applying the ML model.

At stage 220, the user device can detect an object in the video stream. In an example, the VDI client can use an object detection model to identify objects in the video stream. The object detection model can be built in to the VDI client or come from a third-party, such as TENSORFLOW. In an example, the object detection model can also classify the object. For example, the detected object can be another user device or camera.

In another example, the user device can detect another person. This can be part of object detection or a separate process. The ML model can attempt to identify the person. For example, a co-worker can be identified and then the system can determine whether that co-worker is authorized to view the user's screen or the content of the managed application.

At stage 230, the user device can compare the object to a list. For example, the UEM system can have lists of authorized and unauthorized objects and persons. The VDI client can compare the object to the list to determine whether the object or person is permitted in view of the virtual session. As an example, the UEM system may prohibit cell phones in viewing range of the virtual session because most cell phones have cameras and can be used to take pictures of sensitive information. In one example where the detected object is the face of another person, the VDI client can apply the ML model to the face to determine whether the person is authorized to view the virtual session. In one such example, the ML model can be trained to identify all authorized users. Alternatively, to preserve computing resources on the user device, the VDI client can capture information about the person's face and send it to the UEM system to determine whether the person is authorized.

At stage 240, the user device can execute a mitigation action based on whether the object is an authorized object. For example, if it is an authorized object, no further action may be required. However, where the object is unauthorized, the VDI client can take predetermined security measures. Some examples can include different modes that the VDI client can operate in, and the modes can govern what actions the VDI client takes when it detects an object. For example, objects can be classified based on an authorization level, and different mitigations can be taken based on the different levels. Whereas a coworker may have an authorization level of 2, an unidentified person may have an authorization level of 0.

One example mode can be a mitigation mode. In the mitigation mode, the VDI client can be configured to limit or prevent unauthorized viewing of the virtual session. As some examples, in mitigation mode, when an unauthorized object or person is detected, the VDI client can minimize the virtual session screen, force logging off the virtual session, and disconnect the virtual session. This can help prevent any unauthorized person from viewing or taking pictures of the virtual session.

Another example mode can be a surveillance mode. In the surveillance mode, instead of shutting down the virtual session, the VDI client can analyze the video stream and gather certain types of information. In an example, such information can be used for investigating a breach. As some examples, the VDI session can In some examples, the VDI client can dynamically change modes during a virtual session depending on what is being displayed. For example, the mitigation action taken can vary during a virtual session depending on the content being displayed. In one example, when no sensitive content is being displayed, the VDI client can operate in a surveillance mode. Without any sensitive content being displayed, there may not be any danger of sensitive information being stolen. In such an instance, minimizing the display or force logging off the virtual session can be unduly burdensome on the user trying to use the virtual session. Instead, the VDI session can collect data about the session as described above. However, if the user loads a sensitive application or loads a file with sensitive data, the VDI client can switch to mitigation mode. If any unauthorized user or object is detected, the VDI client can take a mitigation action to prevent any potential unauthorized viewing or capturing of the sensitive data. If the user closes the sensitive application or file, the VDI client can return to surveillance mode. This type of dynamic monitoring can help provide a better experience for the user by limiting unnecessary interruptions.

In some examples of dynamic monitoring, an administrator can determine when each mode should be implemented. For example, an administrator can indicate for which files and applications the VDI client should implement a mitigation mode. An administrator can also configure the mitigation actions to be taken when an unauthorized object is detected. For example, an administrator can determine whether, in a mitigation mode, the VDI client should terminate the virtual session or minimize the display.

In some examples, the mitigation actions can be configurable, such as by server, virtual session, or application. For examples, the VDI client can be configured to minimize the screen if a certain application is open in the virtual session, but it can terminate the session if an unauthorized object is detected while a different application is open. In one example, the mitigation action can depend on the user accessing the virtual session. In another example, the mitigation action can depend on where the virtual session is being accessed. For example, if the virtual session is being access from inside an enterprise office or network, the VDI client can implement surveillance mode or minimize the display when an authorized object is detected. However, where the virtual session is accessed externally, the VDI client can be configured to take more stringent security measures, such as force log off, terminate the session, or require additional authentication.

Figure 3:
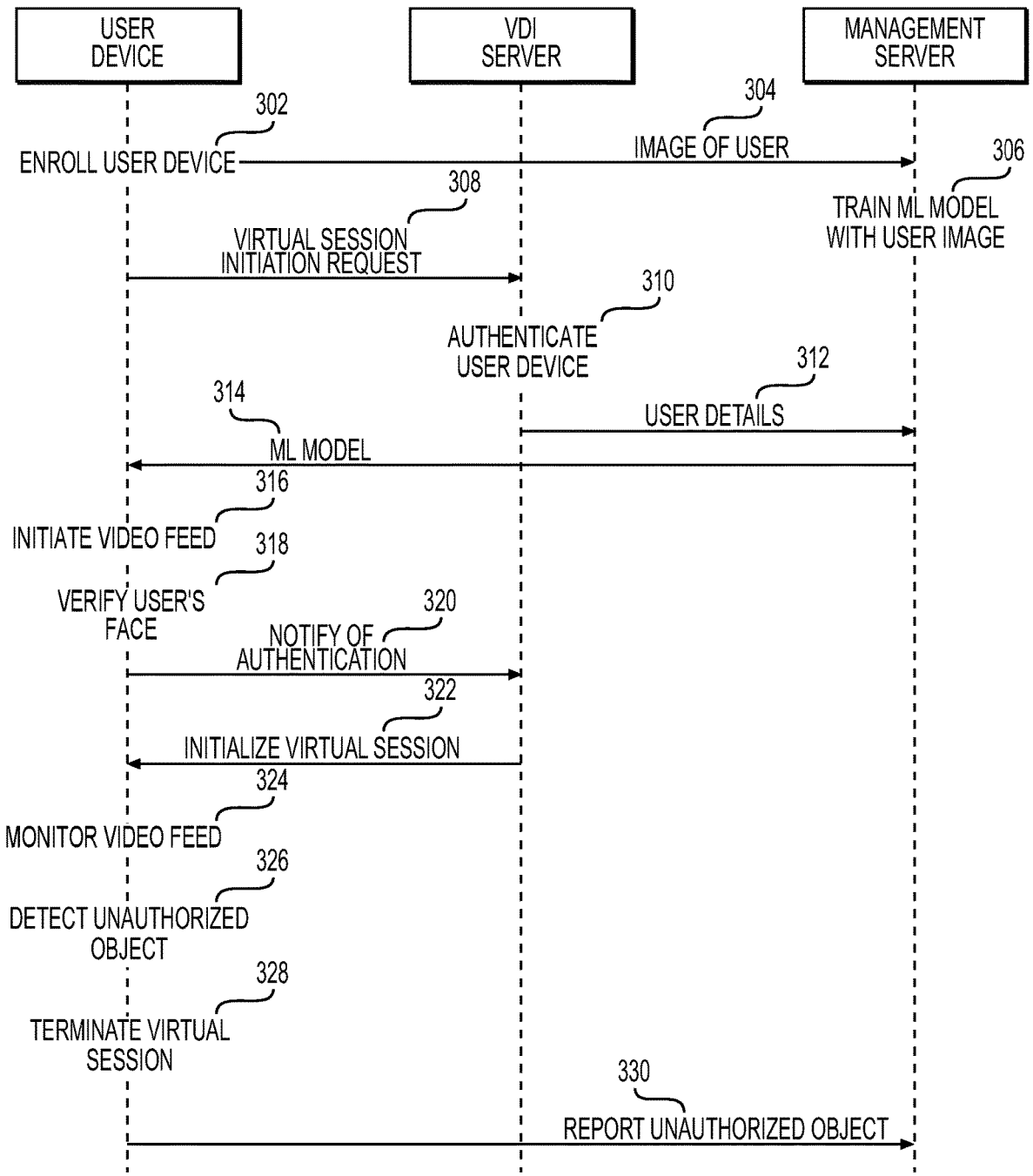
FIG. 3 is a sequence diagram of an example method for managing access to a virtual session.

FIG. 3 is a sequence diagram of an example method for managing access to a virtual session. At stage 302, a user device can enroll with a management server. For example, the management server can be part of a UEM system that manages and secures user devices that are enrolled with the enterprise. The user device can include a management application that is responsible for enrolling the user device in the UEM system and ensuring that the user device is up to date with compliance and security settings prior to accessing enterprise data and resources. When a user logs into the management application on the user device for the first time, the management application can communicate with the management server to enroll the user device. Enrollment can include retrieving and installing all the necessary compliance and security settings on the user device. Enrollment can also include registering the user device with the user's account.

At stage 304, the user device can capture an image of the user and send it to the management server. This can be done as part of the enrollment process, but it can also occur after the user device is enrolled. For example, the UEM system may require a user image on file for the user to access certain resources, and the user can be prompted to provide an image after an administrator grants the user access to those resources. In an example, the user can be required to take a picture of his or her face using a live camera. This can help ensure that the image of the user is current so that it can be used to train an ML model to identify the user. As an example, the management application can access a camera on the user device and the user can be required to take a picture of his or her face using the management application. In another example, an administrator can take a picture of the user and load it in the UEM system.

At stage 306, the management server can train an ML model to identify the user based on the user image(s). The management server can be the same server that enrolled the user device, but that is not required. For example, the management server can be a group of cloud-based servers that each perform specific functions. In one example, the management server can include, or have access to, facial recognition software or a facial recognition API. Training the ML model can include using the facial recognition software or API to recognize the user's face in an image or live video stream.

At stage 308, the user device can send a virtual session initiation request to a VDI server. The user device can be the same user device from stage 302, but it can also be another device. For example, the user can enroll a user device and provide a facial image using one user device, and then the user can request initiation of a virtual session from another device. In an example, the user device can include a VDI client that is responsible for rendering virtual sessions on the user device. As an example, the VDI client can be a remote desktop application. The user can send a virtual session initiation request by inputting login information into the VDI client, such as information identifying the virtual session and login credentials.

At stage 310, the VDI server can authenticate the user device. In an example, this can include receiving user credentials and checking them with an authentication service.

At stage 312, the VDI server can send details about the user to the management server. The details can include information identifying the user and indicate that the user is requesting access to a virtual session, as an example. This information can be used by the management server to retrieve an ML model trained to identify the user and send it to the user device.

At stage 314, the management server can send the trained ML model to the user device. In an example, the management server train and store ML models for each user who has virtual session access. Whenever a user requests access, the management server can retrieve the ML model for that user and send it to the user device requesting the virtual session. In one example, the management server can train a single ML model for all authorized users. In another example, the management server can send ML models for all authorized users to the user device so that the VDI client can determine whether an additional face detected in a live video stream is also an authorized user.

At stage 316, the user device can initiate a video stream. For example, the user device can include or be connected to a live camera device, such as a web cam. The VDI client can instruct the web cam to begin recording video.

At stage 318, the user device can verify the user's face in the video stream. This can include applying the ML model to the video stream to identify the user's face. Verifying the user's face in this manner can help prevent unauthorized access to someone who may have requested virtual session using stolen credentials. In one example, the user device can verify that the user's face matches above a threshold amount based on the ML model. As an example, the user's face can be verified if the face in the video matches to a minimum percentage of the ML model.

In one example, the user device can also analyze the video stream to determine whether any other objects or persons are present. For example, the VDI client can apply an object model to identify any objects aside from the user. If an object is detected, the VDI client can identify the object. In one example, the VDI client can create a session log and update the log with any objects it detects. In another example, the VDI client notify the VDI server. In still another example, the VDI client or VDI server can determine whether to initiate the virtual session based on whether the object is authorized to be within the viewing area of the virtual session. For example, a pencil may be allowed, but a cell phone may be prohibited to prevent anyone from taking pictures of the virtual session.

At stage 320, the user device can notify the VDI server whether the user's face could be verified. At stage 322, the VDI server can initiate the virtual session with the user device. In one example where the user's face cannot be verified above a threshold level, the VDI server can instead deny the virtual session request. In examples where the virtual session is allowed, the VDI server can configure the virtual session based on the facial verification. This can include loading applications, data, and network drives for the desktop environment of the virtual session.

In an example, the VDI server can disable certain features of the virtual session based on any detected objects or persons in the video stream. For example, the VDI server can disable any sensitive applications or data where an unauthorized object or person is detected. In one example, where the user device cannot obtain a live video stream from a video device, the VDI server can deny the virtual session request. In another example, the VDI server can allow access to the virtual session, but configure it with sensitive applications and data disabled.

At stage 324, the user device can monitor the video stream. This can include, as an example, applying the ML model to verify the user while the virtual session is active. This can also include applying an object model to detect and identify any objects or persons that appear in the video stream. The VDI client can compare any detected objects or persons to a list to determine whether it is authorized to be in the viewing area of the virtual session.

At stage 326, the user device can detect an unauthorized object. For example, the VDI client can detect and identify an object in the video stream using an object model. The VDI client can compare the identified object to a list of unauthorized objects and determine that it is on the list. The VDI client can also be configured to classify an object as unauthorized if it is not on an approved list. An unauthorized object can include a person that is not an authorized user or a face that the VDI client cannot identify.

At stage 328, the user device can terminate the virtual session. Terminating the virtual session can include, as some examples, minimizing the virtual session screen, force logging off the virtual session, and disconnecting the virtual session. In an example, the VDI client can prevent the user from reconnecting or re-displaying the virtual session until the unauthorized object is no longer detected in the video stream. In another example, the user can be prevented from re-initializing the virtual session until an administrator approves.

At stage 330, the user device can report the unauthorized object to the management server. For example, the VDI client can analyze the video stream and gather certain information. As some examples, the VDI session can gather information about who has viewed the virtual session, what objects are detected during the virtual session, what is being displayed when an object or person is detected, login details, and access locations. In an example, the user device can perform stage 330 and not stage 228. For example, the VDI client can log the detected object without shutting down the virtual session.

In some examples, the VDI client can dynamically monitor the virtual session. For example, the actions taken by the VDI client upon detecting an authorized object can depend on what is being displayed in the virtual session. As an example, where no sensitive information or application is being displayed in the virtual session, the VDI session can gather information about the virtual session, as described at stage 330, without taking any additional action when an authorized object is detected. However, when a sensitive application or content is displayed in the virtual session, the VDI client can perform mitigating actions to prevent unauthorized viewing of the sensitive content. For example, the VDI client can minimize the virtual session screen, force log off the virtual session, or disconnect the virtual session.

Figure 4:
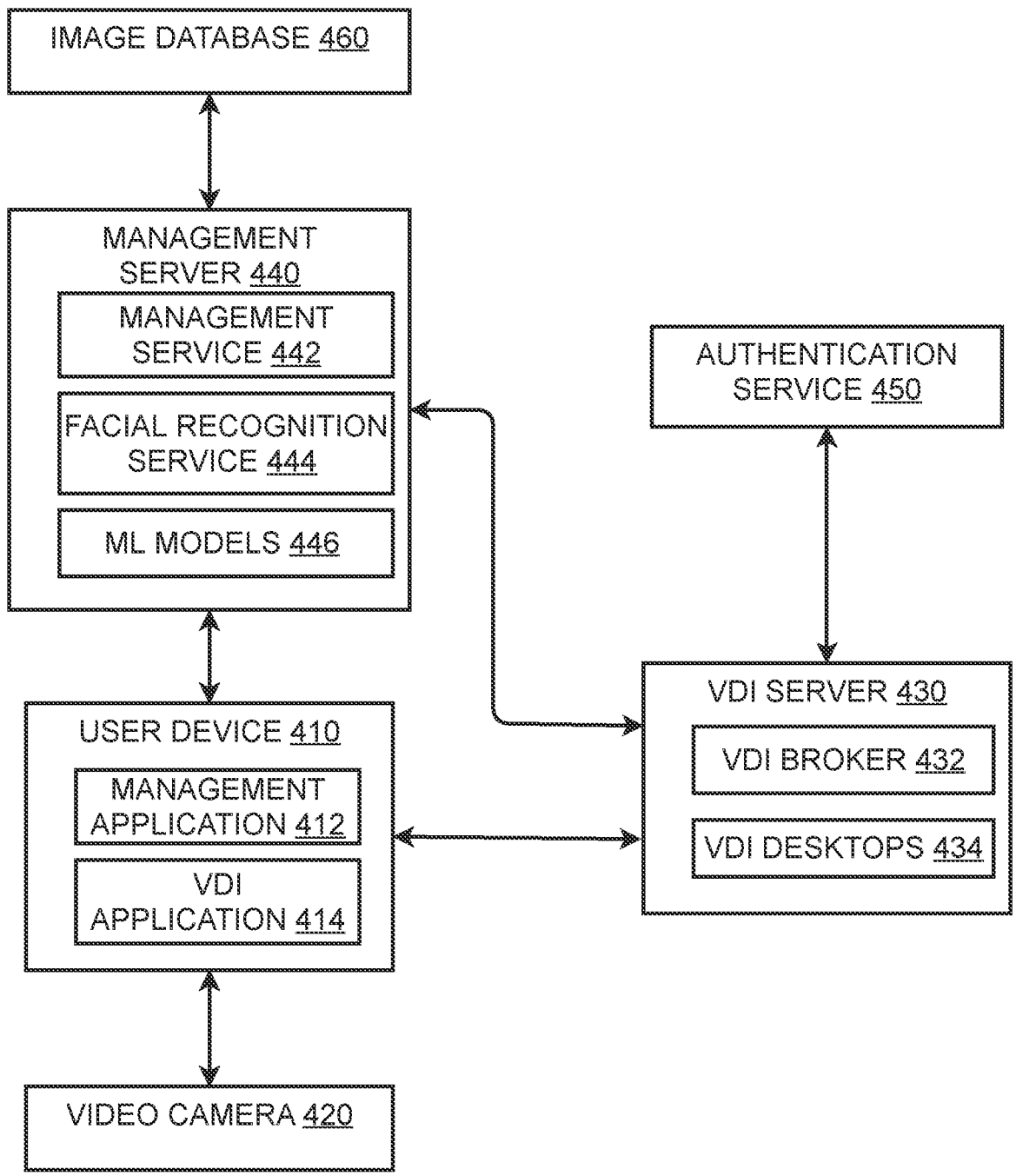
FIG. 4 is an illustration of a system for performing managing access to a virtual session.

FIG. 4 is an illustration of a system for managing access to a virtual session. A user device 410 can include a management application 412 and a VDI client 414. The user device 410 can be one or more processor-based devices, such as a personal computer, tablet, or cell phone. The management application 412 can be a stand-alone application, part of an enterprise application, or part of an operating system of the user device 410. The management application 412 can be part of an enterprise UEM system that manages and secures user devices that are enrolled with the enterprise. For example, the management application 412 can be responsible for ensuring that user devices are up to date with compliance and security settings prior to accessing UEM system data and resources. The management application 412 can communicate with a management service 442 on a management server 440, allowing UEM management of the user device 410 based on compliance and security settings at the management server 440. The management application 412 can enforce compliance at the user device 410, such as by wiping enterprise data when compliance standards are not met. Example compliance standards can include ensuring a device is not jailbroken, that particular encryption standards are used in enterprise data transmission, that the device does not have certain blacklisted applications installed or running, and that the device is located within a geofenced area when accessing certain enterprise resources.

The VDI client 414 can be an application on the user device 410 that is responsible for rendering virtual sessions. For example, the VDI client 414 can provide a remote desktop environment in a user interface. In one example, the VDI client 414 can be a remote desktop application. The VDI client 414 can communicate with a VDI server 430 to provide a virtual session on the user device 410.

The VDI server 430 can include a VDI broker 432 and VDI desktops 434. The VDI server 430 can be a single server or a group of servers, including multiple servers implemented virtually across multiple computing platforms. The VDI broker 432 can be responsible for receiving and authenticating credentials from the user device. For example, the VDI broker 432 can verify credentials with an authentication service 450. The VDI broker 432 can also manage desktop environments and applications in those environments that users have access to. In an example, the VDI broker 432 can also manage mitigating actions taken by the VDI client 414 when an unauthorized object or person is detected. For example, the VDI client 414 can notify the VDI broker 432 when an unauthorized object is detected, and the VDI broker 432 can disable applications or terminate the session from the server side.

The VDI desktops 434 can be a repository of desktop environments that can be used for virtual sessions. In an example, some VDI desktops 434 can be remote devices, and the VDI broker 432 can retrieve the desktop environment of the remote device for the virtual session. The VDI desktops 434 can execute as virtual machines in an example.

The VDI server 430 can communicate with the management server 440 to provide the management server with details of a virtual session request. For example, the VDI server 430 can send user images to the management server 440 so that the management server 440 can train an ML model 446 to identify the user. The management server 440 can store the images in an image database 460. The management server 440 can utilize a facial recognition service or API 444 to train the ML model 446. In an example, the facial recognition service 444 can be a third-party service. In another example, the ML models can be trained on a separate server or set of servers.

In an example, when a user requests a virtual session, the VDI server 430 can provide the user's username so that the management server 440 can retrieve an ML model 446 for the user. The management server 440 can send the ML model 446 for the user so that the VDI client 414 can use it to verify the user's face in a live video stream from a video camera 420. The video camera 420 can be a device with video recording capability, such as a web cam. The VDI client 414 can communicate with the video camera to initialize a live video stream of the area in front of the user device 410. The VDI client 414 can apply the ML model 446 to verify the user upon login and to monitor the video stream for any unauthorized objects or persons.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for managing access to virtual desktop infrastructure (VDI) sessions between a user device of a user and a VDI server, wherein the user is authorized to view private data of an organization through the VDI sessions, the method comprising:

transmitting, by the user device to a management server, an image of the authorized user, wherein the management server trains a machine learning (ML) model based on a plurality of images of authorized users including the image, to identify people who are not authorized users in video streams to be captured using a video camera in or connected to the user device, the video camera being positioned to capture objects in a viewing area of the user device, and wherein the management server further trains the ML model to identify image capturing devices in the video streams;

acquiring the ML model by the user device from the management server;

capturing a first video stream of the viewing area using the video camera and establishing a first VDI session between the user device and the VDI server through which the user device receives first interface data from the VDI server;

identifying, by the user device using the ML model, one or more people in the first video stream that are not authorized users, and then, in response to identifying the one or more people, terminating the first VDI session by the user device when the first interface data shows the private data, to stop the user device from receiving the first interface data;

capturing a second video stream of the viewing area using the video camera and establishing a second VDI session between the user device and the VDI server through which the user device receives second interface data from the VDI server; and identifying, by the user device using the ML model, one or more image capturing devices in the second video stream, and then, in response to identifying the one or more image capturing devices, terminating the second VDI session by the user device when the second interface data shows the private data, to stop the user device from receiving the second interface data.

2. The method of claim 1, further comprising:
in response to identifying the one or more people in the first video stream, sending, by the user device to the VDI server, a notification indicating the identification of the one or more people; and
in response to identifying the one or more image capturing devices in the second video stream, sending, by the user device to the VDI server, a notification indicating the identification of the one or more image capturing devices.

3. The method of claim 1, further comprising:
capturing the first video stream using the video camera in response to the first interface data showing the private data.

4. A non-transitory, computer-readable medium containing instructions that, when executed by a hardware-based processor, cause the processor to perform a method for managing access to virtual desktop infrastructure (VDI) sessions between a user device of a user and a VDI server, the user being authorized to view private data of an organization through the VDI sessions, wherein the method comprises:
transmitting, by the user device to a management server, an image of the authorized user, wherein the management server trains a machine learning (ML) model based on a plurality of images of authorized users including the image, to identify people who are not authorized users in video streams to be captured using a video camera in or connected to the user device, the video camera being positioned to capture objects in a viewing area of the user device, and wherein the management server further trains the ML model to identify image capturing devices in the video streams;
acquiring the ML model by the user device from the management server;
capturing a first video stream of the viewing area using the video camera and establishing a first VDI session between the user device and the VDI server through which the user device receives first interface data from the VDI server;
identifying, by the user device using the ML model, one or more people in the first video stream that are not authorized users, and then, in response to identifying the one or more people, terminating the first VDI session by the user device when the first interface data shows the private data, to stop the user device from receiving the first interface data;
capturing a second video stream of the viewing area using the video camera and establishing a second VDI session between the user device and the VDI server through which the user device receives second interface data from the VDI server; and
identifying, by the user device using the ML model, one or more image capturing devices in the second video stream, and then, in response to identifying the one or more image capturing devices, terminating the second VDI session by the user device when the second interface data shows the private data, to stop the user device from receiving the second interface data.

5. The non-transitory, computer-readable medium of claim 4, wherein the method further comprises:
in response to identifying the one or more people in the first video stream, sending, by the user device to the VDI server, a notification indicating the identification of the one or more people; and
in response to identifying the one or more image capturing devices in the second video stream, sending, by the user device to the VDI server, a notification indicating the identification of the one or more image capturing devices.

6. The non-transitory, computer-readable medium of claim 4, wherein the method further comprises:
capturing the first video stream using the video camera in response to the first interface data showing the private data.

7. A user device of a user including a processor and memory, wherein the processor executes instructions stored in the memory to access virtual desktop infrastructure (VDI) sessions between the user device and a VDI server, the user being authorized to view private data of an organization through the VDI sessions, by performing the following steps:
transmitting, to a management server, an image of the authorized user, wherein the management server trains a machine learning (ML) model based on a plurality of images of authorized users including the image, to identify people who are not authorized users in video streams to be captured using a video camera in or connected to the user device, the video camera being positioned to capture objects in a viewing area of the user device, and wherein the management server further trains the ML model to identify image capturing devices in the video streams;
acquiring the ML model from the management server;
capturing a first video stream of the viewing area using the video camera and establishing a first VDI session between the user device and the VDI server to receive first interface data from the VDI server;
identifying, using the ML model, one or more people in the first video stream that are not authorized users, and then, in response to identifying the one or more people, terminating the first VDI session when the first interface data shows the private data, to stop receiving the first interface data;
capturing a second video stream of the viewing area using the video camera and establishing a second VDI session between the user device and the VDI server to receive second interface data from the VDI server; and
identifying, using the ML model, one or more image capturing devices in the second video stream, and then, in response to identifying the one or more image capturing devices, terminating the second VDI session when the second interface data shows the private data, to stop receiving the second interface data.

8. The user device of claim 7, wherein the steps further include:
in response to identifying the one or more people in the first video stream, sending a notification to the VDI server indicating the identification of the one or more people; and
in response to identifying the one or more image capturing devices in the second video stream, sending a notification to the VDI server indicating the identification of the one or more image capturing devices.

9. The user device of claim 7, wherein the steps further include:
capturing the first video stream using the video camera in response to the first interface data showing the private data.

10. The method of claim 1, further comprising:
after beginning to capture the first video stream using the video camera but before establishing the first VDI session, identifying, by the user device, the authorized user in the first video stream using the ML model; and in response to identifying the authorized user in the first video stream, transmitting, by the user device to the VDI server, a notification that the authorized user is verified for the first VDI session, wherein in response to the user device transmitting the notification, the first VDI session is established.

11. The method of claim 1, wherein the first interface data shows the private data, and the first VDI session is terminated in response to identifying the one or more people.

12. The method of claim 11, wherein the second interface data shows the private data, and the second VDI session is terminated in response to identifying the one or more image capturing devices.

13. The method of claim 1, wherein terminating the first VDI session comprises disconnecting the first VDI session by the user device.

14. The non-transitory, computer-readable medium of claim 4, wherein the method further comprises:
after beginning to capture the first video stream using the video camera but before establishing the first VDI session, identifying, by the user device, the authorized user in the first video stream using the ML model; and
in response to identifying the authorized user in the first video stream, transmitting, by the user device to the VDI server, a notification that the authorized user is verified for the first VDI session, wherein in response to the user device transmitting the notification, the first VDI session is established.

15. The non-transitory, computer-readable medium of claim 4, wherein the first interface data shows the private data, and the first VDI session is terminated in response to identifying the one or more people.

16. The non-transitory, computer-readable medium of claim 15, wherein the second interface data shows the private data, and the second VDI session is terminated in response to identifying the one or more image capturing devices.

17. The non-transitory, computer-readable medium of claim 4, wherein terminating the first VDI session comprises disconnecting the first VDI session by the user device.

18. The user device of claim 7, wherein the steps further include:
after beginning to capture the first video stream using the video camera but before establishing the first VDI session, identifying the authorized user in the first video stream using the ML model; and
in response to identifying the authorized user in the first video stream, transmitting, to the VDI server, a notification that the authorized user is verified for the first VDI session, wherein in response to the user device transmitting the notification, the first VDI session is established.

19. The user device of claim 7, wherein the first interface data shows the private data, and the first VDI session is terminated in response to identifying the one or more people.

20. The user device of claim 7, wherein terminating the first VDI session comprises disconnecting the first VDI session.

* * * * *